US012771000B2

(12) United States Patent
Na et al.

(10) Patent No.: US 12,771,000 B2
(45) Date of Patent: Oct. 20, 2026

(54) BINARY LIQUID CRYSTAL PHASE SHIFTER INCLUDING PHASE SHIFT REGIONS THAT ARE SELECTIVELY TURNED ON OR OFF BY BIASING ELECTRODES

(71) Applicant: THE INDUSTRY & ACADEMIC COOPERATION IN CHUNGNAM NATIONAL UNIVERSITY, Daejeon (KR)

(72) Inventors: Junhee Na, Sejong-si (KR); Dowon Kim, Daejeon (KR); Kitae Kim, Daejeon (KR)

(73) Assignee: The Industry & Academic Cooperation in Chungnam National University, Daejeon (KR)

( * ) Notice: Subject to any disclaimer, the term of this patent is extended or adjusted under 35 U.S.C. 154(b) by 296 days.

(21) Appl. No.: 18/618,290

(22) Filed: Mar. 27, 2024

(65) Prior Publication Data

US 2024/0332769 A1 Oct. 3, 2024

(30) Foreign Application Priority Data

Mar. 30, 2023 (KR) ........................ 10-2023-0042083

(51) Int. Cl.
*H01P 1/18* (2006.01)
*H01P 9/00* (2006.01)
*H01Q 3/36* (2006.01)

(52) U.S. Cl.
CPC .............. *H01P 1/181* (2013.01); *H01P 1/184* (2013.01); *H01P 9/006* (2013.01); *H01Q 3/36* (2013.01)

(58) Field of Classification Search
CPC ........... H01P 1/181; H01P 1/184; H01P 9/006
USPC .......................................................... 333/161
See application file for complete search history.

(56) References Cited

U.S. PATENT DOCUMENTS 5,307,033 A * 4/1994 Koscica et al. ......... H01P 1/181
333/33

FOREIGN PATENT DOCUMENTS

KR 10-2001-0076788 A 8/2001

* cited by examiner

*Primary Examiner* — Benny T Lee
(74) *Attorney, Agent, or Firm* — You & IP, LLC

(57) ABSTRACT

Proposed is a liquid-crystal-based binary phase shifter using a liquid crystal, a material in the spotlight in the super-high-frequency field. The liquid-crystal-based binary phase shifter includes a phase shift circuit board having an upper substrate and a lower substrate combined each other with a spacer having a liquid crystal cell gap therebetween, a liquid crystal being inserted into the spacer; metal vias provided at opposite ends of the upper substrate with transmission lines between the metal vias; and a phase shift meander line provided on a lower metal ground plane placed between the metal vias positioned at the opposite ends, wherein phase shift regions of the lower metal ground plane are selectively divided and bias is discretely applied by region. Beyond the use of a liquid crystal in an RF circuit, a unique method of applying a bias voltage is proposed for a variable speed of the liquid crystal, thereby obtaining the maximum phase shift amount and the highest response speed.

2 Claims, 8 Drawing Sheets

113 (S1, S2, S3, S4)

Electrodes 140 (Vs1, Vs2, Vs3, Vs4)

| Phase shift | S1 (30°) | S2 (30°) | S3 (90°) | S4 (180°) |
|---|---|---|---|---|
| 0° | 0 | 0 | 0 | 0 |
| 30° | 1 | 0 | 0 | 0 |
| 60° | 1 | 1 | 0 | 0 |
| 90° | 0 | 0 | 1 | 0 |
| 120° | 0 | 1 | 1 | 0 |
| 150° | 1 | 1 | 1 | 0 |
| 180° | 0 | 0 | 0 | 1 |
| 210° | 1 | 0 | 0 | 1 |
| 240° | 1 | 1 | 0 | 1 |
| 270° | 0 | 0 | 1 | 1 |
| 300° | 0 | 1 | 1 | 1 |
| 330° | 1 | 1 | 1 | 1 |

FIG. 3

BINARY LIQUID CRYSTAL PHASE SHIFTER INCLUDING PHASE SHIFT REGIONS THAT ARE SELECTIVELY TURNED ON OR OFF BY BIASING ELECTRODES

BACKGROUND OF THE INVENTION

Field of the Invention

The present disclosure relates to a liquid-crystal-based binary phase shifter. More particularly, the present disclosure relates to a liquid-crystal-based binary phase shifter using a liquid crystal, a material in the spotlight in the super-high-frequency field.

Description of the Related Art

A phase shifter is a device for adjusting the phase of an electromagnetic wave and is used in various fields, such as wireless communication, radar, and satellite communications. The phase shifter is mainly used to process electromagnetic waves in millimeter wave and super-high-frequency bands.

Recently, there has been a lot of research on a high-performance beamforming antenna for obtaining high gain, a fast transmission speed, and a wide signal coverage in a wireless communication system.

A key component that affects the performance of a beamforming antenna is a phase shifter, which is a variable circuit. There is a great need for a phase shifter with a low cost, a low power consumption, a low loss, and a fast response speed.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) Korean Patent Application Publication No. 10-2001-0076788 (16 Aug. 2001)

SUMMARY OF THE INVENTION

The present disclosure is directed to providing a liquid-crystal-based binary phase shifter having an improved response speed by applying a bias voltage for a variable speed of a liquid crystal.

According to the present disclosure, there is provided a liquid-crystal-based binary phase shifter including a phase shift circuit board having an upper substrate and a lower substrate combined with each other by a spacer having a liquid crystal cell gap therebetween, a liquid crystal being inserted into the spacer; metal vias provided at opposite ends of the upper substrate with transmission lines between the metal vias; and a phase shift meander line provided on a lower metal ground plane placed between the metal vias positioned at the opposite ends, wherein phase shift regions of the lower metal ground plane are selectively divided and bias is discretely applied by region.

The phase shift circuit board may be configured to obtain a plurality of phase differences depending on whether a maximum voltage is applied to the phase shift regions, and obtain all phase shift values from 0 degrees to 330 degrees at regular intervals.

In addition, the phase shift circuit board may be configured to realize phase shifts from 0 degrees to 330 degrees by turning on and off the bias voltage for each of the phase shift regions, the bias voltage being indicated by a number 1 or 0.

In addition, bias electrodes may be separated by region to apply different bias voltages to the respective regions of the phase shift circuit board, and the metal ground plane may be separated while the meander line is left intact.

In addition, the phase shift circuit board may have the metal ground plane located at the upper substrate, and a bias electrode for each region at the layer immediately on the metal ground plane, thereby achieving bias separation and allowing RF to pass through.

According to the present disclosure, beyond the use of a liquid crystal in an RF circuit, a unique method of applying a bias voltage is proposed for the variable speed of the liquid crystal, thereby securing the possibility of obtaining the maximum phase shift amount and the highest response speed. In addition, the present disclosure expands the technology for the design of a liquid-crystal-based RF circuit, which has been in the spotlight recently.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3 shows a result of setting a binary phase shifter to obtain phase differences at 30-degree intervals;

DETAILED DESCRIPTION OF THE INVENTION

Figure 1:
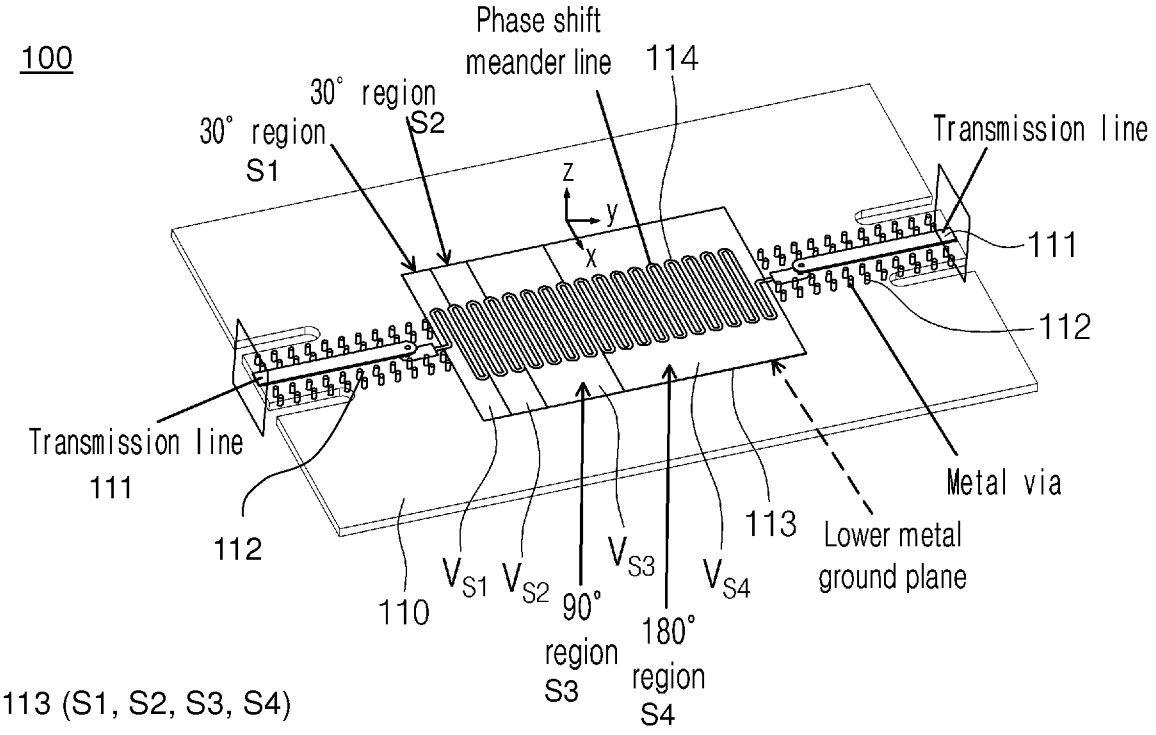
FIG. 1 shows the configuration of a liquid-crystal-based binary phase shifter according to an embodiment of the present disclosure.

Hereinafter, the present disclosure will be described in detail with reference to the accompanying drawings. However, the present disclosure is not limited or restricted by exemplary embodiments thereof. The same reference numerals shown in the drawings and described in the detail description indicate members that perform substantially the same function.

Objectives and effects of the present disclosure may be naturally understood or more apparent from the following description, and the objectives and the effects of the present disclosure are not limited to the following description. Also, in describing the present disclosure, if it is decided that a detailed description of the known art related to the present disclosure makes the subject matter of the present disclosure unclear, the detailed description will be omitted.

Taking into consideration a fast response speed of a liquid crystal when a high voltage is applied, a liquid-crystal-based binary phase shifter according to an embodiment of the present disclosure provides a method of obtaining a predetermined phase shift value by dividing the phase shifter into several sections and applying a high-voltage bias to each of the sections. Herein, since a high-voltage bias is used, the response speed of the liquid-crystal-based phase shifter can be improved.

In order to design a phase shifter using a feature that a response speed of a liquid crystal is fast when the maximum voltage is applied, the liquid-crystal-based binary phase shifter according to the embodiment divides bias regions of the liquid-crystal-based phase shifter to design a discrete-type phase shifter, and separates a ground plane and applies bias discretely by region. Herein, bias electrodes are inserted in parallel near the ground plane to achieve bias separation and a sufficient capacitance for an RF signal.

Figure 2:
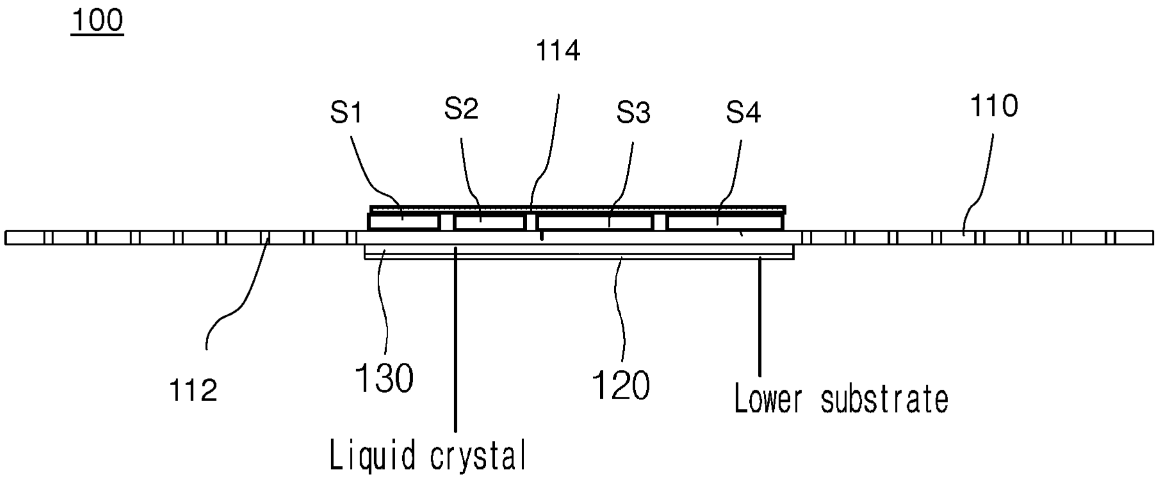
FIG. 2 shows a liquid-crystal-based phase shift circuit according to an embodiment of the present disclosure.

FIG. 1 shows the configuration of a liquid-crystal-based binary phase shifter according to an embodiment of the present disclosure. FIG. 2 shows a liquid-crystal-based phase shift circuit according to an embodiment of the present disclosure.

As shown in FIGS. 1 and 2, a liquid-crystal-based binary phase shifter according to the embodiment includes a phase shift circuit board 100 in which an upper substrate 110 and a lower substrate 120 (FIG. 2) are combined with each other by a spacer 130 having a liquid crystal cell gap therebetween, a liquid crystal being inserted into the spacer 130 (FIG. 2); the metal vias 112 provided at opposite ends of the upper substrate 110 with transmission lines 111 (FIG. 1) between the metal vias; and a phase shift meander line 114 provided on a metal ground plane 113 (FIG. 1) placed between the metal vias 112 positioned at the opposite ends, wherein phase shift regions of the metal ground plane 113 are selectively divided and bias is discretely applied by region.

Herein, the liquid-crystal-based binary phase shifter uses only two values, which are the permittivity when the minimum voltage is applied and the permittivity when the maximum voltage is applied, so that a discrete-type phase shift method rather than a continuous-type phase shift method is obtained to improve the variable speed of the liquid-crystal-based phase shifter.

Thus, the liquid-crystal-based binary phase shifter according to the embodiment uses only a specific maximum value rather than continuous intermediate values as a bias applied voltage to improve the response speed of the phase shifter and selectively drives active regions of the phase shifter, thereby realizing a variable phase shifter.

The phase shift circuit board obtains the phase differences of 30 degrees, 30 degrees, 90 degrees, and 180 degrees depending on whether the maximum voltage is applied to the phase shift regions, and obtains all phase shift values from 0 degrees to 330 degrees at 30-degree intervals as shown in FIG. 1.

In addition, the phase shift circuit board 100 is configured to realize phase shifts from 0 degrees to 330 degrees by turning on and off the bias voltage of each phase shift region, the bias voltage being indicated by the number 1 or 0.

In addition, in the phase shift circuit board 100, bias electrodes 140 (Vs1, Vs2, Vs3, Vs4) are connected to the separated regions and configured to apply different bias voltages to the respective regions of the phase shift circuit board 100, and the metal ground plane 113 is separated while the meander line 114 is left intact (which means that the meander line 114 is not separated).

In addition, the phase shift circuit board 100 has the metal ground plane 113 located at the upper substrate 110, and a bias electrode for each region at the layer immediately on the metal ground plane 113, thereby achieving bias separation and allowing RF to pass through.

In other words, the present invention applies voltage by directly connecting the bias electrodes to surfaces of the separated regions without the need to add a separate bias electrode pattern. (That is, there is no need for an electrode pad for bias application.

Figure 5:
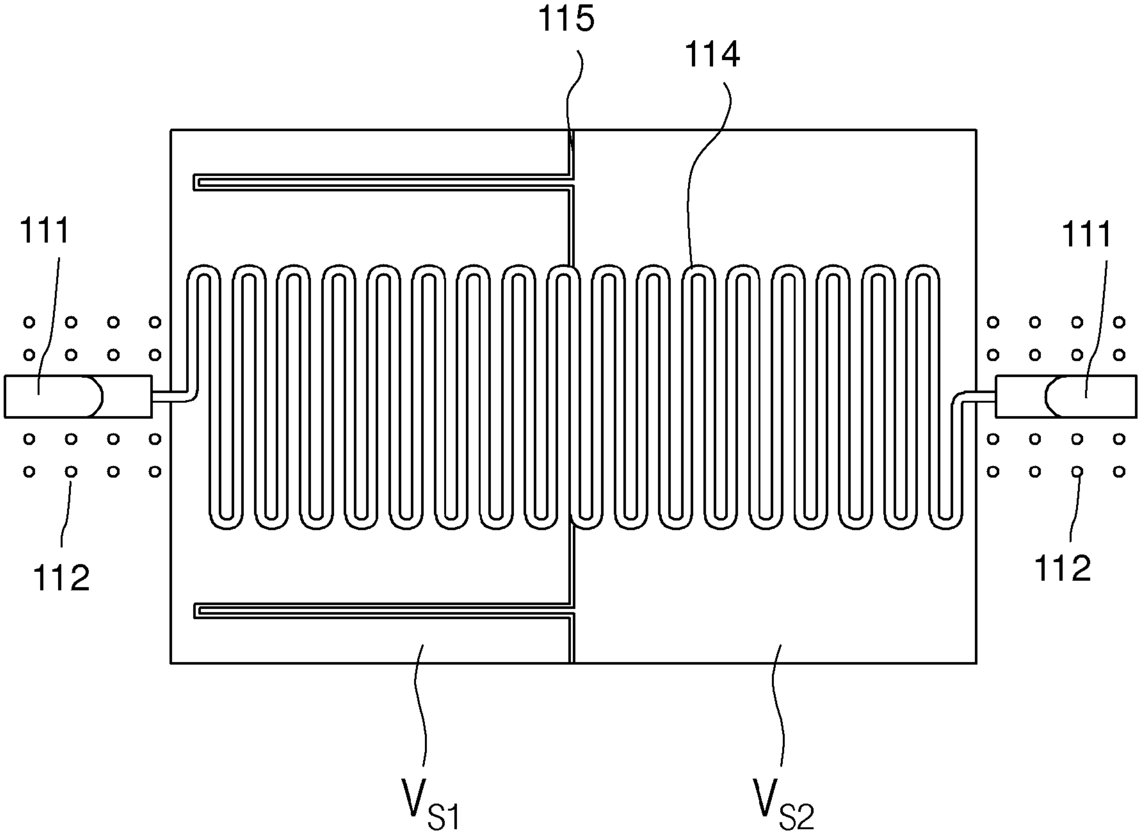
FIG. 5 shows an interdigitation line inserted into a ground plane for bias separation.
Figure 7:
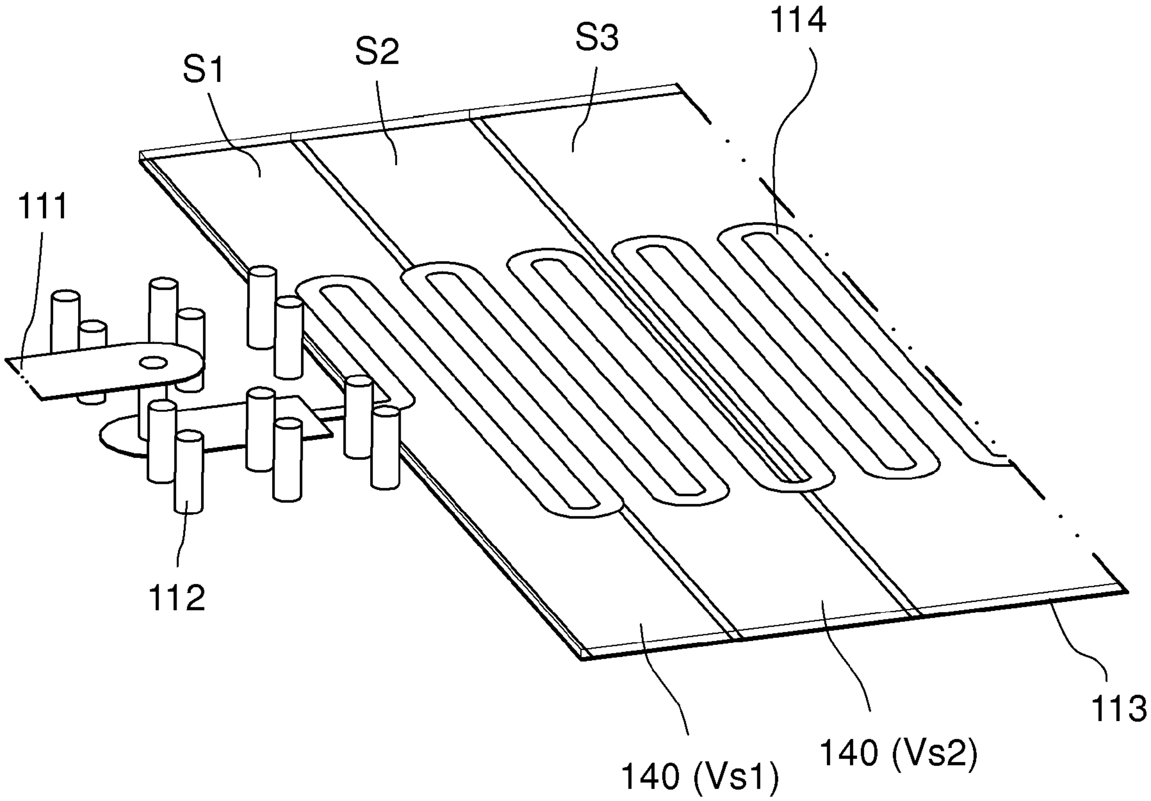
FIG. 7 shows a metal ground plane and bias electrodes designed in a double layer.

FIGS. 1, 5, and 7 show how the bias electrodes for each region are connected (Vs1, Vs2, Vs3, Vs4).

FIG. 2 shows a liquid-crystal-based phase shift circuit according to an embodiment of the present disclosure.

A liquid-crystal-based phase shift circuit may be designed and manufactured as shown in FIG. 2.

That is, two substrates, the upper and lower substrates 110 and 120, are combined in the form of a sandwich. Herein, the two substrates are combined with each other by a spacer 130 having a desired liquid crystal cell gap therebetween. Next, a liquid crystal is injected into the liquid crystal cell gap created by the spacer in the middle.

To briefly describe the characteristics of a liquid crystal, a bias voltage applied thereto changes the polarization direction of the liquid crystal. That is, if electrodes 140 are placed at the top and the bottom of the liquid crystal and the liquid crystal is oriented in a direction parallel to the electrodes, the liquid crystal molecules are all arranged in the direction parallel to the electrodes when a voltage is not applied, but the liquid crystal molecules are arranged in a direction perpendicular to the electrodes (the direction parallel to the electric field) when a voltage is applied to the substrates on and under the liquid crystal.

Therefore, when a voltage is 0 V, the permittivity of a liquid crystal has a value of $\varepsilon_{\perp}$. The higher the voltage, the closer the permittivity of the liquid crystal to the value of $\varepsilon_{\parallel}$. When a circuit using a liquid crystal in a super-high-frequency band is realized, the permittivity aeolotropy (a property in which the permittivity of liquid crystal molecules changes along its long and short axes depending on the voltage) of the liquid crystal is used.

Herein, a permittivity that changes continuously depending on the voltage may be obtained. The present disclosure proposes a binary phase shifter that uses two values, which are the permittivity when the minimum voltage is applied and the permittivity when the maximum voltage is applied, by selectively dividing the regions of the phase shifter circuit as shown in FIG. 2.

FIG. 2 shows one example of a binary phase shifter designed to divide a phase shift region into four regions S1, S2, S3, S4 and obtain the phase differences of 30 degrees, 30 degrees, 90 degrees, and 180 degrees depending on whether the maximum voltage is applied, so that all phase shift values from 0 degrees to 330 degrees are obtained at 30-degree intervals.

In the embodiment, the phase differences of 30 degrees, 30 degrees, 90 degrees, and 180 degrees are obtained depending on whether the maximum voltage is applied. However, no limitation thereto is imposed, and any phase difference may be set in addition to 15 degrees.

FIG. 3 shows a result of setting a binary phase shifter to obtain phase differences at 30-degree intervals.

When the bias voltage for each region is turned on (set to the maximum value), the bias voltage is indicated by the number "1". When the bias voltage is turned off (0 V is applied), the bias voltage is indicated by the number "0".

When the binary phase shifter is set as shown in the table of FIG. 3, phase shifts from 0 degrees to 330 degrees may be realized.

The table in FIG. 3 shows an example of a method for applying a bias voltage to each region to obtain a desired phase difference in the circuit of FIG. 1. As shown in FIG. 3, each phase shift is implemented through different bias combinations. For example, if a bias voltage is applied only to region S1 and no voltage is applied to the remaining regions (S1=1, S2=0, S3=0, S4=0), a phase delay of 30° can be obtained. Additionally, if a phase shift of 60° is desired, bias voltages can be applied simultaneously to regions S1 and S2 (S1=1, S2=1, S3=0, S4=0) so that the phase differences of the two regions are summed. A 300° phase shift is implemented through a combination of applying bias to regions S2, S3, and S4 (S1=0, S2=1, S3=1, S4=1), which is the result of combining 30°, 90°, and 180° phase components. In this way, by binary controlling the combination of biases applied to each region, various discrete phase states can be efficiently implemented. At this time, the voltage applied to each region is of the same magnitude.

Figure 4:
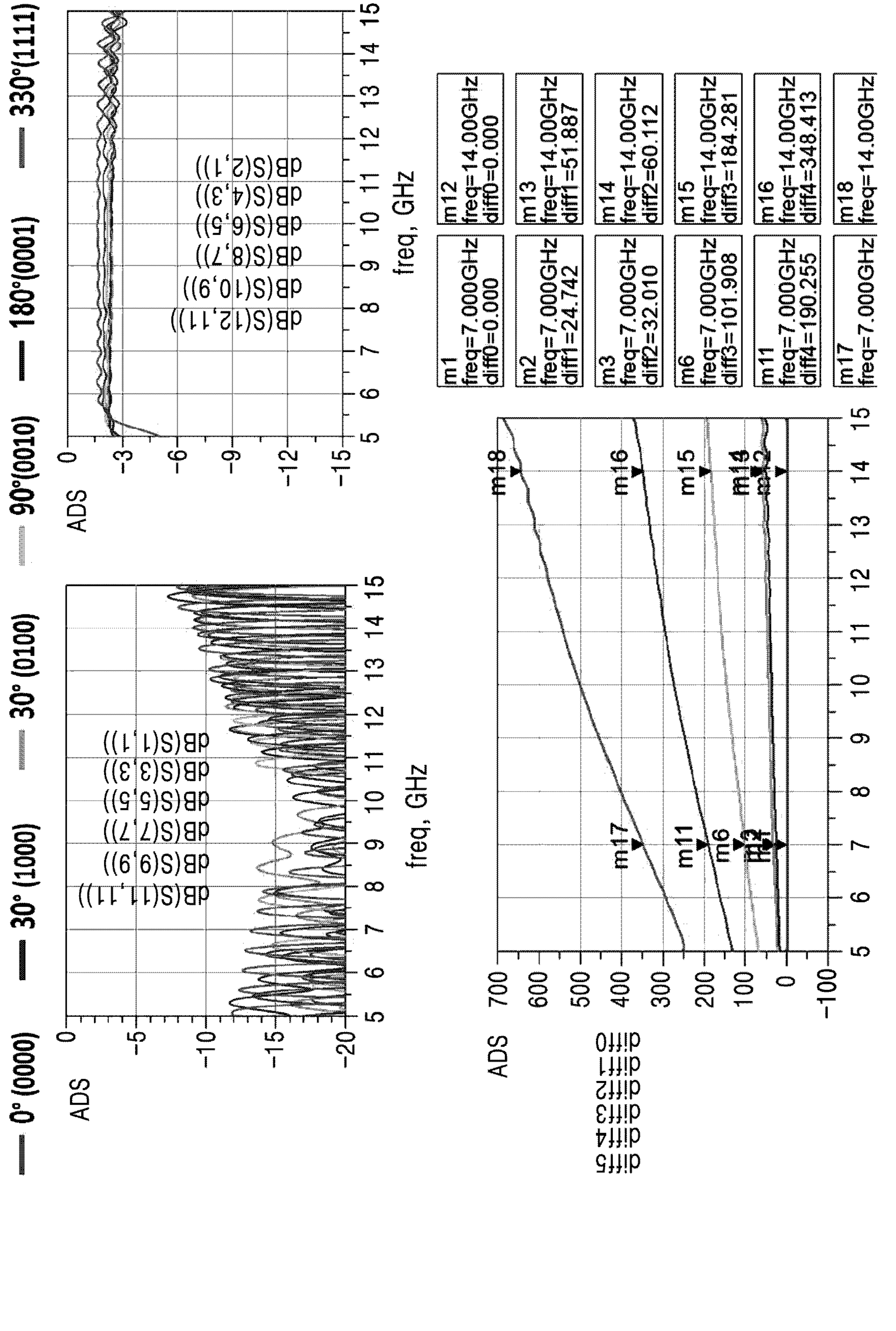
FIG. 4 shows a result of obtaining a mismatch value and an insertion loss value of a binary phase shifter through simulation.

FIG. 4 shows a result of obtaining a mismatch value and an insertion loss value of a binary phase shifter through simulation, and shows a phase shift graph with six different phase differences of (0000), (1000), (0100), (0010), (0001), and (1111) with respect to voltages applied to the regions S1, S2, S3, and S4.

Herein, in order to apply different bias voltages to the respective regions of the phase shifter, bias electrodes need to be separated by region.

The graphs in FIG. 4 represent the change in performance according to the frequency of the circuit when a bias voltage is selectively applied to each region (S1 to S4) as illustrated in FIG. 3. Specifically, the upper graphs in FIG. 4 plot the reflection coefficient or insertion loss characteristics according to different bias combinations (e.g., 0000, 1000, 0100, 0010, 0001, 1111) as a function of frequency, and it can be confirmed that similar loss characteristics are maintained across the entire frequency band. This implies that the loss characteristics of the circuit do not change significantly depending on the phase state change. Additionally, the lower graph in FIG. 4 shows the phase difference according to each bias combination as a function of frequency, demonstrating that the phase changes discretely under different bias states. For example, at specific frequencies (e.g., 7 GHZ and 14 GHz), the phase difference between each bias state is distributed at regular intervals, indicating that the designed phase steps (e.g., 30°, 90°, 180°, etc.) are effectively implemented.

FIG. 5 shows an interdigitation line inserted into a metal ground plane for bias separation.

To this end, the present disclosure proposes a method of separating a metal ground plane 113 while leaving a meander line 114 intact. In FIG. 5, the interdigitation line 115 is inserted into the metal ground plane 113 to separate the ground plane.

Figure 6:
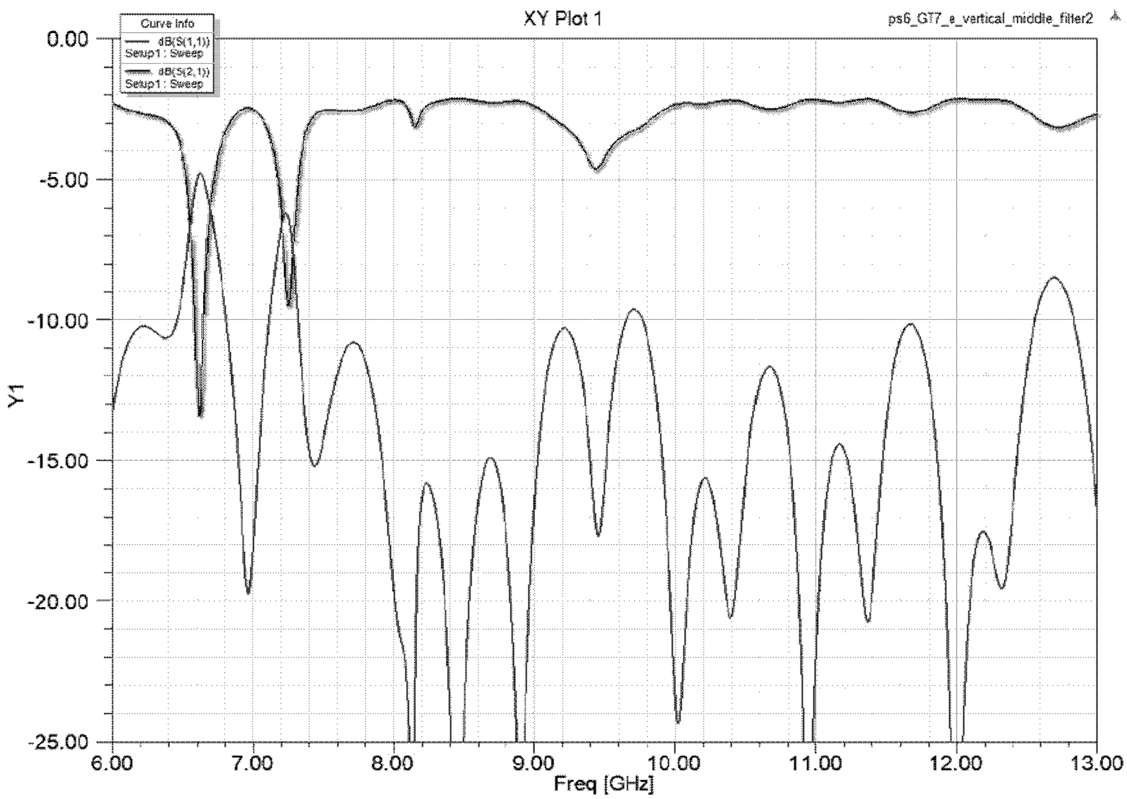
FIG. 6 shows a result of a simulation using bias electrodes separated by an interdigitation line in a ground plane.

FIG. 6 shows a result of a simulation using bias electrodes separated by an interdigitation line in a ground plane.

It was found that there were a frequency bands in which RF signal loss increases slightly, but insertion loss remained constant in the frequency band of interest, 11 to 12 GHz. In addition, it is difficult to realize a sufficient capacitance by only inserting an interdigitation line into a ground plane. As a second method of applying a voltage, proposed is a method of obtaining a sufficient capacitance for RF signal transmission by inserting an additional metal pattern layer of bias electrodes in a parallel direction close to a ground plane.

The graph in FIG. 6 shows the transmission loss (S21) according to the frequency of the entire phase shifter circuit after inserting an RF band-pass filter structure utilizing an interdigitate-line into the ground plane. Referring to FIG. 6, it can be seen that in the low frequency band below 10 GHz, there is a section where the insertion loss relatively increases due to the filter characteristics. This is due to the blocking characteristics of the band-pass filter, which means that low-frequency components are suppressed. On the other hand, in the 11~12 GHz range, which is the frequency band of interest of the present invention, the insertion loss is shown to maintain a relatively low and stable value, which means that signal transmission is efficiently achieved in that band. Therefore, by applying a filter structure using an interdigitate line, good transmission characteristics can be secured in the target RF band while suppressing low-frequency bias components.

Figure 8:
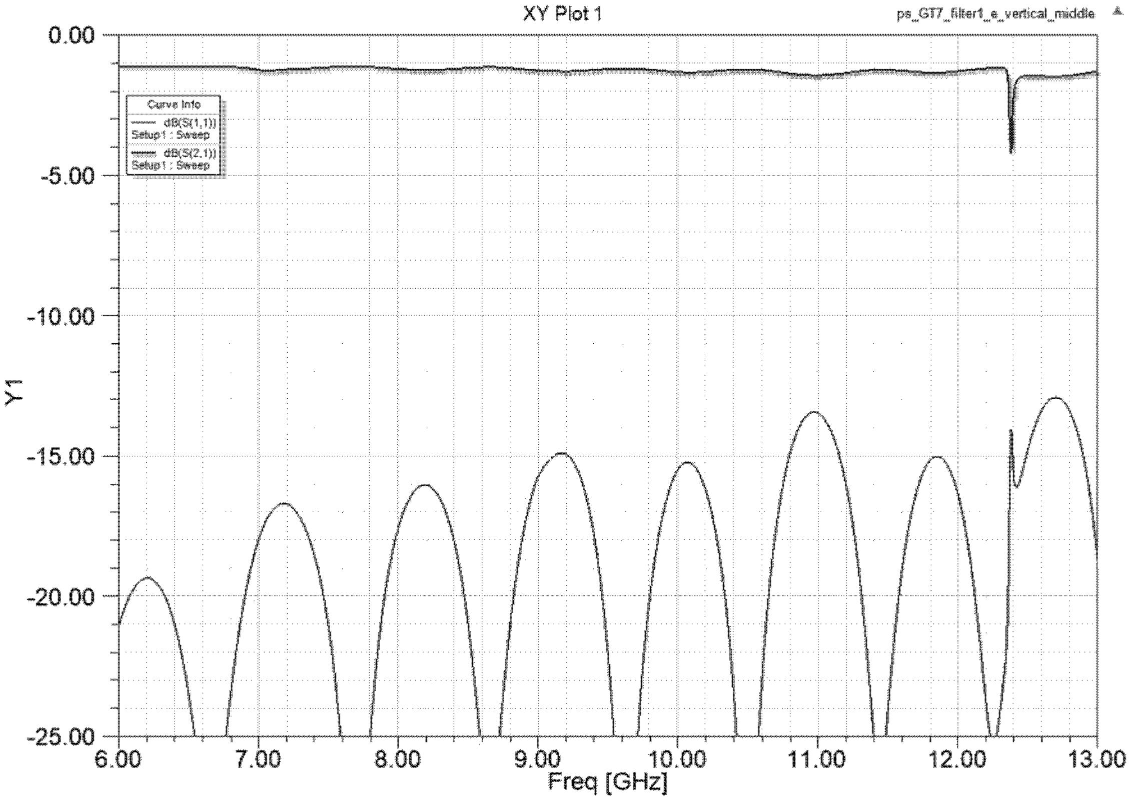
FIG. 8 shows a result of a simulation of the performance of a filter inserted in a double layer.

FIG. 7 shows a metal ground plane 113 and bias electrodes 140 designed in a double layer. FIG. 8 shows a result of a simulation of the performance of a filter inserted in a double layer.

That is, as shown in FIG. 7, the metal ground plane 113 is present at the lowest layer and the bias electrode 140 for each region is located at the layer immediately on the metal ground plane 113, so that bias separation is achieved and RF sufficiently passes through. As a result, it was found from the simulation result of FIG. 8 that compared to the use of an interdigitation line, a RF signal passed with a less loss value in a wider frequency band.

The graph in FIG. 8 shows the insertion loss (S21) characteristics when a double filter structure is applied, in which an additional metal layer is formed in a double manner on a separated ground plane structure to increase capacitance. As the effective capacitance increases due to the added metal layer, the transmission characteristics of the RF signal are improved, and it can be confirmed that low insertion loss is maintained over a wide frequency band ranging from approximately 6 GHZ to 12 GHz. In particular, compared to the case where an interdigitate-line is applied, it is shown that low loss characteristics are secured over a wider frequency band, which means that it contributes to expanding the bandwidth of the filter and improving transmission efficiency.

Taking into consideration a fast response speed of a liquid crystal when a high voltage is applied, a liquid-crystal-based binary phase shifter according to an embodiment of the present disclosure provides a method of obtaining a predetermined phase shift value by dividing the phase shifter into several sections and applying a high-voltage bias to each of the sections. Herein, since a high-voltage bias is used, the response speed of the liquid-crystal-based phase shifter can be improved.

In addition, beyond the use of a liquid crystal in an RF circuit, the liquid-crystal-based binary phase shifter according to the embodiment proposes a unique method of applying a bias voltage for the variable speed of the liquid crystal, thereby securing the possibility of obtaining the maximum phase shift amount and the highest response speed. In addition, the present disclosure expands the technology for the design of a liquid-crystal-based RF circuit, which has been in the spotlight recently.

The present disclosure proposes a discrete-type phase shift method rather than a continuous-type phase shift method, to improve a variable speed of a liquid-crystal-based phase shifter, and verified its effectiveness through simulation.

In addition, in order to apply the bias voltages separated for the respective phase shift regions, two methods of realizing an RF filter were also proposed.

A beamforming antenna that uses a phase shifter as a key component is a system widely used in satellite communications. Depending on the application, a beam scanning speed is an important performance indicator.

A liquid-crystal-based binary phase shifter according to an embodiment of the present disclosure may be used as a method for improving a variable speed when various variable circuits using a liquid crystal are designed. In addition, the liquid-crystal-based variable circuit may be used as a key component of a beamforming antenna, and may contribute to design of variable circuits suitable for various applications by providing a variable speed and a phase change amount suitable for each application field through the use of a bias application method for a liquid crystal and the maximum voltage value.

In addition, beyond the use of a liquid crystal in an RF circuit, a unique method of applying a bias voltage is proposed for the variable speed of the liquid crystal, thereby securing the possibility of obtaining the maximum phase shift amount and the highest response speed. The present disclosure expands the technology for the design of a liquid-crystal-based RF circuit, which has been in the spotlight recently.

The binary phase shifter proposed in the present disclosure uses only a specific maximum value rather than continuous intermediate values as a bias applied voltage to improve the response speed of the phase shifter and selectively drives active regions of the phase shifter, thereby realizing a variable phase shifter. Therefore, the variable phase shifter is expected to be used as a key component for improving a beam scanning speed of a beamforming antenna.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A liquid-crystal-based binary phase shifter, comprising:

an upper substrate; and a lower substrate combined with the upper substrate;

a spacer disposed between the upper substrate and the lower substrate and having a liquid crystal cell gap therebetween, a liquid crystal being inserted into the liquid crystal cell gap of the spacer;

metal vias provided at either side of the upper substrate;

transmission lines provided at either side of the upper substrate and placed between the metal vias; and a metal ground plane provided at a central portion of the upper substrate and placed between the metal vias, wherein the metal ground plane including a plurality of phase shift regions separated from each other by interdigitation lines;

a plurality of bias electrodes selectively connected to each of the plurality of phase shift regions and configure to selectively apply a bias voltage to each of the plurality of phase shift regions;

a phase shift meander line provided on the metal ground plane, wherein phase shift is achieved by selectively turning on or off the bias electrodes of corresponding regions.

2. The liquid-crystal-based binary phase shifter of claim 1, wherein the liquid-crystal-based binary phase shifter is configured to obtain a plurality of phase differences depending on whether a maximum voltage is applied to the phase shift regions, and obtain all phase shift values from 0 degrees to 330 degrees at regular intervals.

* * * * *